US012701382B2

(12) United States Patent
Falk

(10) Patent No.: US 12,701,382 B2
(45) Date of Patent: Aug. 4, 2026

(54) RENDERING OF AUDIO ELEMENTS

(71) Applicant: Telefonaktiebolaget LM Ericsson (publ), Stockholm (SE)

(72) Inventor: Tommy Falk, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 149 days.

(21) Appl. No.: 18/706,355

(22) PCT Filed: Oct. 27, 2022

(86) PCT No.: PCT/EP2022/080044

§ 371 (c)(1), (2) Date: Apr. 30, 2024

(87) PCT Pub. No.: WO2023/073081

PCT Pub. Date: May 4, 2023

(65) Prior Publication Data

US 2024/0422500 A1 Dec. 19, 2024

Related U.S. Application Data

(60) Provisional application No. 63/274,108, filed on Nov. 1, 2021.

(51) Int. Cl.
*H04S 7/00* (2006.01)

(52) U.S. Cl.
CPC ........... *H04S 7/304* (2013.01); *H04S 2400/11* (2013.01); *H04S 2400/13* (2013.01)

(58) Field of Classification Search
CPC .. H04S 7/304; H04S 2400/11; H04S 2400/13; H04S 7/302; H04S 2420/11
See application file for complete search history.

(56) References Cited

U.S. PATENT DOCUMENTS 10,390,171 B2 8/2019 Lee et al.
11,540,079 B2 * 12/2022 Terentiv .................. H04S 7/302
(Continued)

FOREIGN PATENT DOCUMENTS

EP 3989605 B1 * 12/2024 ............. H04S 7/304
JP 2013-223098 A 10/2013
(Continued)

OTHER PUBLICATIONS

International Search Report and Written Opinion dated Feb. 7, 2023 in International Application No. PCT/EP2022/080044 (10 pages).
(Continued)

*Primary Examiner* — David L Ton
(74) *Attorney, Agent, or Firm* — Rothwell, Figg, Ernst & Manbeck, P.C.

(57) ABSTRACT

A method for rendering an audio element. The method includes at least one of the following steps: (1) determining a top gain value (G_top) for a top part of an interior representation of the audio element based on L and T, where L is the vertical distance between a reference plane and a listening point and T is a vertical distance between the reference plane and a topmost point of an extent of the audio element or (2) determining a bottom gain value (G_bottom) for a bottom part of the interior representation of the audio element based on L and B, where B is a vertical distance between the reference plane and a bottommost point of the extent of the audio element.

26 Claims, 10 Drawing Sheets

(56) References Cited

U.S. PATENT DOCUMENTS

| | | | | |
|---|---|---|---|---|
| 11,930,351 | B2 * | 3/2024 | Falk | H04S 7/303 |
| 2016/0029144 | A1 * | 1/2016 | Cartwright | H04R 5/04 381/310 |
| 2020/0128347 | A1 * | 4/2020 | Schissler | H04S 3/008 |
| 2022/0030375 | A1 * | 1/2022 | Falk | H04S 7/304 |
| 2023/0262405 | A1 * | 8/2023 | Falk | H04S 7/303 381/303 |
| 2023/0262407 | A1 * | 8/2023 | Terentiv | H04S 7/304 381/303 |

FOREIGN PATENT DOCUMENTS

| | | | |
|---|---|---|---|
| JP | 2019-146160 | A | 8/2019 |
| WO | 2021/118352 | A1 | 6/2021 |
| WO | 2021/144308 | A1 | 7/2021 |

OTHER PUBLICATIONS

ISO 23090-4:202#(X), ISO/IEC JTC 1/SC 29/WG 6, 2022, "MPEG-1 (Introductory element—Main element—Part#: Audio)" (273 pages).

ISO/IEC JTC 1/SC 29, Oct. 12, 2016, ISO/IEC 23008-3:201x(E), ISO/IEC JTC 1/SC 29/WG 11, Secretariat: JISC, "Information technology—High efficiency coding and media delivery in heterogeneous environments—Part 3: 3D audio" (799 pages).

BTF Renderer Group, Ebu Operating Eurovision and Euroradio, TECH 3388, ADM Renderer for Use in Next Generation Audio Broadcasting, Geneva, Mar. 2018 (57 pages).

Kronlachner, M., "Spatial transformations for the enhancement of Ambisonic recordings" (Jan. 2014) (5 pages).

Schissler, C. et al., "Efficient HRTF-based Spatial Audio for Area and Volumetric Sources", IEEE Transactions on Visualization and Computer Graphics, vol. 22, No. 4, Apr. 2016 (11 pages).

* cited by examiner

RENDERING OF AUDIO ELEMENTS

CROSS REFERENCE TO RELATED APPLICATIONS

This application is a 35 U.S.C. § 371 National Stage of International Patent Application No. PCT/EP2022/080044, filed 2022 Oct. 27, which claims priority to U.S. Provisional Patent Application No. 63/274,108, filed on 2021 Nov. 1. The above-identified applications are incorporated by this reference.

TECHNICAL FIELD

Disclosed are embodiments related to rendering of audio elements.

BACKGROUND

Spatial audio rendering is a process used for presenting audio within an extended reality (XR) scene (e.g., a virtual reality (VR), augmented reality (AR), or mixed reality (MR) scene) in order to give a listener the impression that sound is coming from physical sources within the scene at a certain position and having a certain size and shape (i.e., extent). The presentation can be made through headphone speakers or other speakers. If the presentation is made via headphone speakers, the processing used is called binaural rendering and uses spatial cues of human spatial hearing that make it possible to determine from which direction sounds are coming. The cues involve inter-aural time delay (ITD), inter-aural level difference (ILD), and/or spectral difference.

The most common form of spatial audio rendering is based on the concept of point-sources, where each sound source is defined to emanate sound from one specific point. Because each sound source is defined to emanate sound from one specific point, the sound source doesn't have any size or shape. In order to render a sound source having an extent (size and shape), different methods have been developed.

One such known method is to create multiple copies of a mono audio element at positions around the audio element. This arrangement creates the perception of a spatially homogeneous object with a certain size. This concept is used, for example, in the "object spread" and "object divergence" features of the MPEG-H 3D Audio standard (see references [1] and [2]), and in the "object divergence" feature of the EBU Audio Definition Model (ADM) standard (see reference [4]). This idea using a mono audio source has been developed further as described in reference [7], where the area-volumetric geometry of a sound object is projected onto a sphere around the listener and the sound is rendered to the listener using a pair of head-related (HR) filters that is evaluated as the integral of all HR filters covering the geometric projection of the object on the sphere. For a spherical volumetric source this integral has an analytical solution. For an arbitrary area-volumetric source geometry, however, the integral is evaluated by sampling the projected source surface on the sphere using what is called a Monte Carlo ray sampling.

Another rendering method renders a spatially diffuse component in addition to a mono audio signal, which creates the perception of a somewhat diffuse object that, in contrast to the original mono audio element, has no distinct pin-point location. This concept is used, for example, in the "object diffuseness" feature of the MPEG-H 3D Audio standard (see reference [3]) and the "object diffuseness" feature of the EBU ADM (see reference [5]). Combinations of the above two methods are also known. For example, the "object extent" feature of the EBU ADM combines the creation of multiple copies of a mono audio element with the addition of diffuse components (see reference [6]).

In many cases the actual shape of an audio element can be described well enough with a basic shape (e.g., a sphere or a box). But sometimes the actual shape is more complicated and needs to be described in a more detailed form (e.g., a mesh structure or a parametric description format).

Some audio elements are of the nature that the listener can move inside the extent for an audio element (i.e., the spatial boundary of the audio element) and expect to hear a plausible audio representation of the audio element. For these audio elements, the extent acts as a spatial boundary that defines the edge between an interior and an exterior of the audio element. Examples of such audio elements include: a forest (sound of birds, wind in the trees); a crowd of people (the sound of people clapping hands or cheering); and background sound of a city square (sounds of traffic, birds, people walking).

When the listener moves within the spatial boundary of the audio element, the audio representation should be immersive and surround the listener. As the listener moves out of the spatial boundary, the representation should now appear to come from the extent of the audio element.

Although these audio elements could be represented as a multitude of individual point-sources, it is more efficient to represent these with a single audio signal. For the interior audio representation, a listener-centric format, where the sound field around the listener is described, is suitable. Listener-centric formats include channel-based formats as 5.1, 7.1 and scene-based formats such as Ambisonics. Listener-centric formats are typically rendered using several virtual speakers (or "speakers" for short) positioned around the listener.

SUMMARY

Certain challenges presently exist. For example, there is no well-defined way to render a listener-centric audio signal directly when the listener position is outside of the spatial boundary. When the listener is positioned outside the spatial boundary, a source-centric representation is more suitable because the sound source no longer surrounds the listener but should instead be rendered to be coming from a distance in a certain direction. One solution is to use listener-centric audio signal for the interior representation and derive a source-centric audio signal from that, which can then be rendered using source-centric techniques. This technique is described in reference [8]. Further, techniques of rendering the exterior representation of such an audio element, where the extent can be an arbitrary shape, is described in reference [9]. But one challenge with these solutions is to make the transition between the interior and the exterior representation smooth and natural sounding. Reference [10] describes methods to render a smooth transition between the exterior and interior representation. Reference [10] describes a method that attenuates the rear hemisphere of the speaker setup used for the interior rendering when the listener is close to the surface of the extent. This will make the transition more natural since the audio appear to come from within the extent rather than surround the listener when the listener is positioned close to the extent surface. As the listener moves further inside the extent, the attenuation is gradually reduced so that the listener is more and more completely encompassed in the audio from all sides.

The method described in [10] to modify the interior representation when the listener is close to the extent surface is based on an alignment of the speaker system of the interior representation with respect to the surface of the extent of the audio source. This alignment makes it possible to determine the speakers that represent the outside of the extent. Two variations of this method are described, one where the alignment is only done in the horizontal plane and one where the alignment is done based on an observation vector, the vector from the listener position to a target point on the extent.

A problem with the first variation of this method is that there is no way to properly handle a listening point that is above or below the extent since the alignment is only done in the horizontal dimension. Thus, there is no way to modify the interior representation rendering so that the sound from the audio source appears to come from above or below.

The second variation of the method uses an alignment both in horizontal and vertical dimensions that is based on an observation vector, which makes it possible to handle the case when the listener is above or below the extent. But, there the usage of an alignment in both the horizontal and vertical dimension may cause problems with stability in the orientation of the rendering speaker system; it may change rapidly when the listener gets close to the extent surface. In many cases, when the listener is inside an extent, the closest point of the extent will be directly below the listener (e.g., on the "floor" of the extent). When the listener moves closer to the extent surface, at some point the closest point will suddenly be on the closest "wall" of the extent. This would result in sudden and large rotations of the speaker system when the listener gets close to the surface on the extent, which would produce audible artifacts. Also, this method will not properly handle the case when both the rear and upper parts of the speaker system should be attenuated, or both the rear and lower parts.

Accordingly, in one aspect there is provided a method for rendering an audio element. The method includes at least one of the following steps: 1) determining a top gain value (G_top) for a top part of an interior representation of the audio element based on L and T, where L is the vertical distance between a reference plane and a listening point and T is a vertical distance between the reference plane and a topmost point of an extent for the audio element or 2) determining a bottom gain value (G_bottom) for a bottom part of the interior representation of the audio element based on L and B, where B is a vertical distance between the reference plane and a bottommost point of an extent for the audio element.

In another aspect there is provided a computer program comprising instructions which when executed by processing circuitry of an audio renderer causes the audio renderer to perform the above described method. In one embodiment, there is provided a carrier containing the computer program wherein the carrier is one of an electronic signal, an optical signal, a radio signal, and a computer readable storage medium. In another aspect there is provided a rendering apparatus that is configured to perform the above described method. The rendering apparatus may include memory and processing circuitry coupled to the memory.

An advantage of the embodiments disclosed herein is that they handle well the situation in which the listening point is above or below the audio element's extent.

BRIEF DESCRIPTION OF THE DRAWINGS

The accompanying drawings, which are incorporated herein and form part of the specification, illustrate various embodiments.

DETAILED DESCRIPTION

Figure 1:
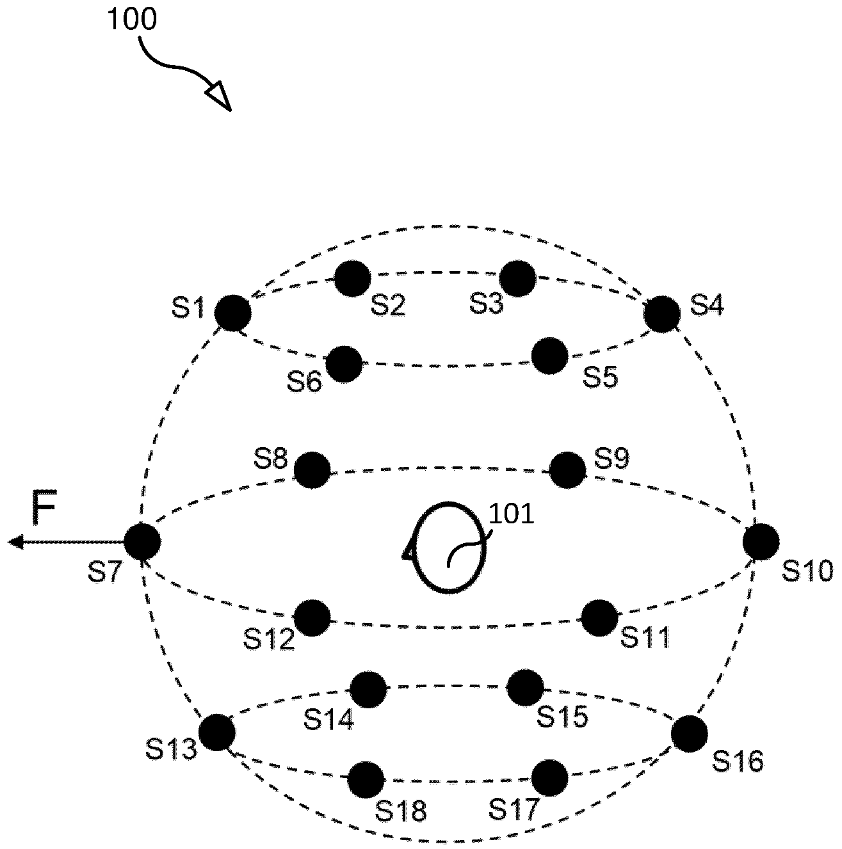
FIG. 1 illustrates an example speaker system.

Typically, the interior representation of an audio element is rendered using a speaker system comprising a set of virtual speakers arranged in a sphere shape around the listening point. This is illustrated in FIG. 1, which shows an example speaker system 100 comprising set of virtual speakers S1-S18 arranged in a sphere shape around a listening position 101 (also referred to as "listener" 101 or "listening point" 101). The number of speakers and their positions may vary, but they are typically arranged at an equal distance from the listener position. The vector F represent the front vector of the speaker system 100. The frontal vector defines the orientation of the speaker system and is independent of the listener's head rotation.

Figure 2:
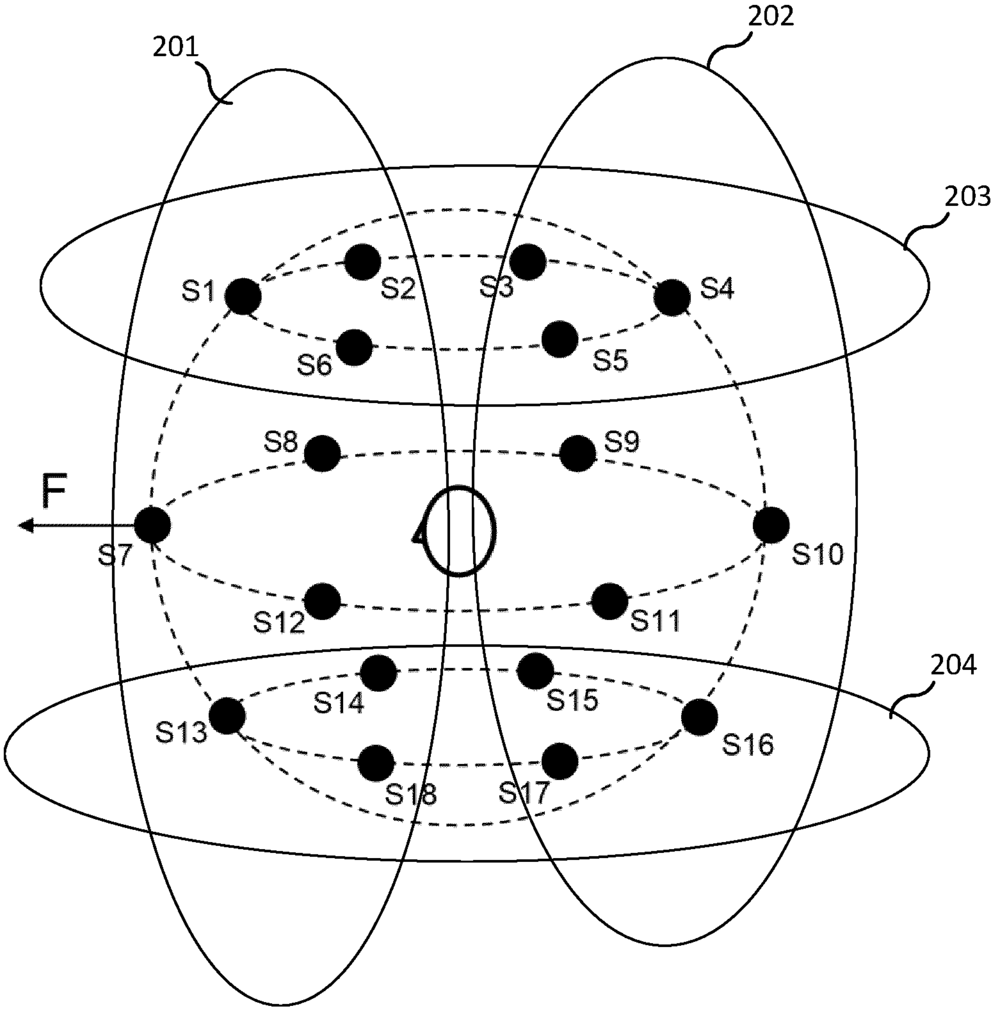
FIG. 2 illustrates an example of dividing a speaker system into hemispheres.
Figure 3A:
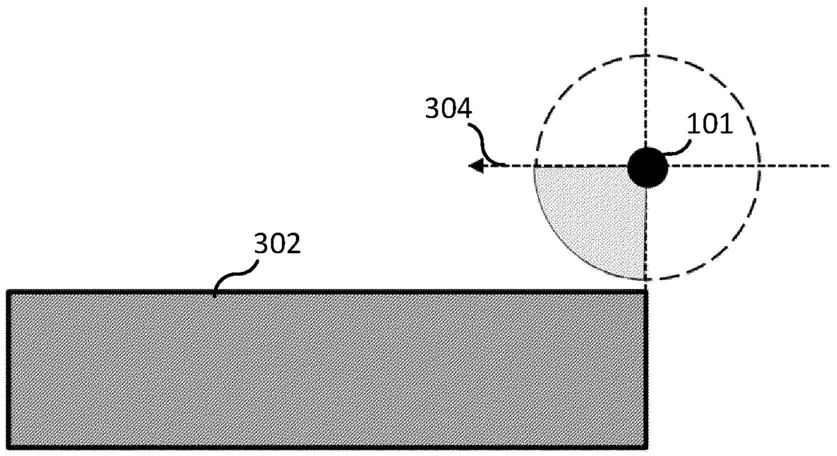
FIG. 3A illustrates a listening point above an audio element.
Figure 3B:
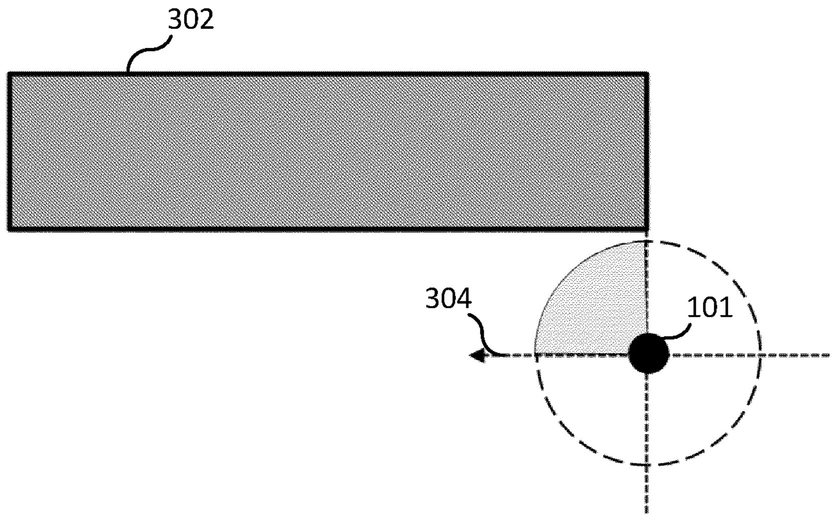
FIG. 3B illustrates a listening point below an audio element.

In one embodiment, the set of speakers S1-S18 is divided in into four hemispheres: front 201, rear 202, top 203, and bottom 204, as shown in FIG. 2. Regardless of the exact configuration of the set of speakers, the speaker system as a whole has a rotation that is defined by the front vector. The front vector represents the direction in which the front hemisphere is aimed. By attenuating the gain of the signals going to the speakers of one of the hemispheres, the sound energy from the corresponding direction can be reduced The gain of the rear, top, and bottom hemispheres can be attenuated independently in order to create the effect that the sound is only coming from the direction of the audio element. For example, if an audio element 302 (see FIG. 3A) is straight in front of the listening point 101, the gain of the rear hemisphere should be attenuated. If the listening point is situated above the audio element, as shown in FIG. 3A, the gain of the top hemisphere should be attenuated. Likewise, if the listening point is situated below the audio element as shown in FIG. 3B, the gain of the bottom hemisphere should be attenuated. If the listening point is above the extent and close to its edge, as shown in FIG. 3A, the gain of both the rear and top hemisphere can be attenuated.

The arrow 304 shown in FIGS. 3A and 3B indicate the front vector of the horizontal alignment of the interior representation speaker setup. In the example shown in FIG. 3A, the listening point 101 is situated above and close to the edge of the audio element 302, which in these examples has a simplified rectangular extent. In this situation the interior representation should be modified so that no audio is heard from above or from the back. This can be achieved by attenuating the top 203 and rear 202 hemispheres of the speaker system. In the example shown in FIG. 3B, the listening point is below the extent and close to the edge, and in this case the interior representation should be modified so that no audio is heard from the bottom or from the back.

The attenuation might either go all the way to zero so that the hemispheres can be completely muted, or it can be limited so the hemispheres are only attenuated to a degree in order to achieve a softer spatial effect.

A separate gain factor (a.k.a., gain value) is calculated for the rear, top, and bottom hemispheres. These gain factors are then applied to the corresponding virtual speaker signals corresponding to the respective hemispheres. Some speakers of the system might belong to two (or more) hemispheres and the signals for these speakers should be affected by the gain factors for each hemisphere in which the speaker belongs.

For example, speaker S4 belongs to both the top and the rear hemispheres. The modified signal, $y_4'$, for that speaker can then be calculate as:

$$y4' = y4 * \text{G\_rear} * \text{G\_top}$$

where $y_4$ is the original signal before the spatial modification and G_rear and G_top are the gain factors for the rear and top hemispheres.

As an example, for the whole speaker system as shown in FIG. 1 and FIG. 2, the calculation could look like this:

$$y'_1=y_1G_{TOP}$$

$$y'_2=y_2G_{TOP}$$

$$y'_3=y_3G_{TOP}G_{REAR}$$

$$y'_4=y_4G_{TOP}G_{REAR}$$

$$y'_5=y_5G_{TOP}G_{REAR}$$

$$y'_6=y_6G_{TOP}$$

$$y'_7=y_7$$

$$y'_8=y_8$$

$$y'_9=y_9G_{REAR}$$

$$y'_{10}=y_{10}G_{REAR}$$

$$y'_{11}=y_{11}G_{REAR}$$

$$y'_{12}=y_{12}$$

$$y'_{13}=y_{13}G_{BOTTOM}$$

$$y'_{14}=y_{14}G_{BOTTOM}$$

$$y'_{15}=y_{15}G_{BOTTOM}G_{REAR}$$

$$y'_{16}=y_{16}G_{BOTTOM}G_{REAR}$$

$$y'_{17}=y_{17}G_{BOTTOM}G_{REAR}$$

$$y_{18}'=y_{18}G_{BOTTOM}.$$

Figure 4:
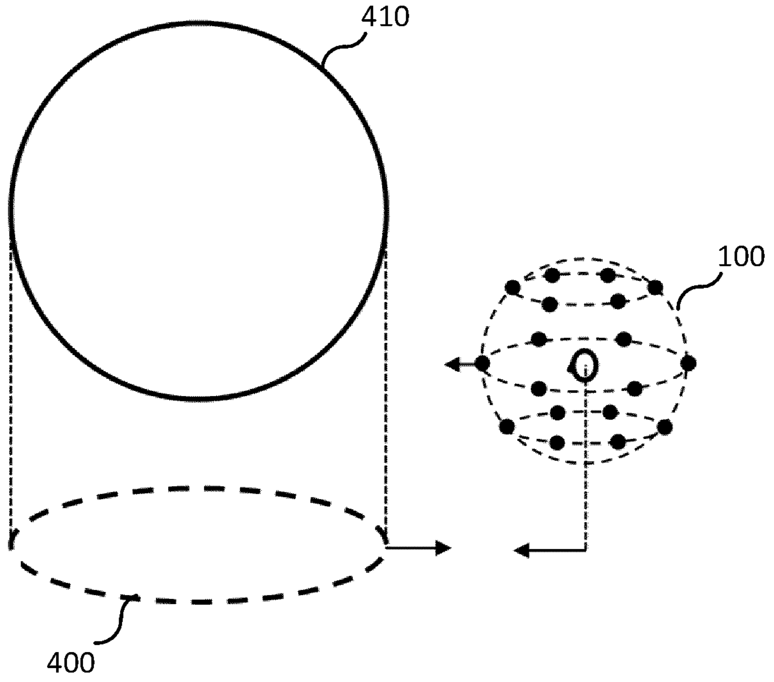
FIG. 4 illustrates a horizontal outline for an audio element.

Calculation of the gain of the rear hemisphere:

In one embodiment, a horizontal alignment of the speaker system 100 is used. This alignment rotates the speaker system so that its front vector is pointing horizontally in the direction of the extent. This alignment does not take the relative height of the extent and listener into account, it is only used to control the attenuation of the rear hemisphere. Since the height information is discarded when doing this alignment, the alignment can be done against the outline of the projection of the extent onto the horizontal plane, as shown in FIG. 4. FIG. 4 shows a horizontal outline 400 that is found by projecting a spherical extent 410 of an audio element onto the horizontal plane and finding the outline of the projection. The front vector of the speaker system 100 should be pointing in the negative direction of the normal of the closest point of the horizontal outline relative to the listening point projected onto the horizontal plane.

The alignment should make sure that the front vector of the speaker system 100 is pointing inwards into the extent and the left and right of the speaker system aligns with the horizontal outline of the extent. As the listener 101 moves around, the rear hemisphere should always point away from the extent. In other words, the front vector of the speaker system should be aligned with the normal of the closest point of the horizontal outline of the extent.

When the listener is at some distance from the extent and not above or below it, the rear hemisphere is always representing the side that is pointing away from the extent and can therefore always be attenuated as long as the listener is not inside the extent.

When the listener is inside, above, or below the extent, the projected listening point will be inside the horizontal outline. In this case, the rear hemisphere should not be attenuated. In order to have a smooth transition, an interior fade region can be used where the attenuation is gradually reduced as is described in reference [10]. The fade region can also be an exterior region so that the attenuation is gradually reduced until the listener crosses the horizontal outline of the extent.

Calculation of the gain of the top and bottom hemispheres:

To control the attenuation of the top hemisphere when the listener is above the extent, or the attenuation of the bottom hemisphere when the listener is below the extent, the height of the listener position should be compared to the height of the extent (i.e., compare the vertical distance between a reference plane and the listening point to the vertical distance between the reference plane and a topmost point of the extent).

In one embodiment the top hemisphere is attenuated if the listener position is higher than the topmost point of the extent (or the topmost point of a selected portion of the extent). For instance, in one embodiment, the top gain factor is a function of the difference between L and T, where L is the vertical distance between the listening point and a reference plane and T is the vertical distance between a topmost point of the audio element (or a simplified extent representing the audio element) and the reference plane. Likewise, the bottom hemisphere is attenuated if the listener position is lower than a bottommost point of the extent (or the bottommost point of a selected portion of the extent). For instance, in one embodiment, the bottom gain factor is a function of the difference between L and B, where B is the vertical distance between a bottommost point of the audio element (or a simplified extent representing the audio element) and the reference plane.

Figure 5:
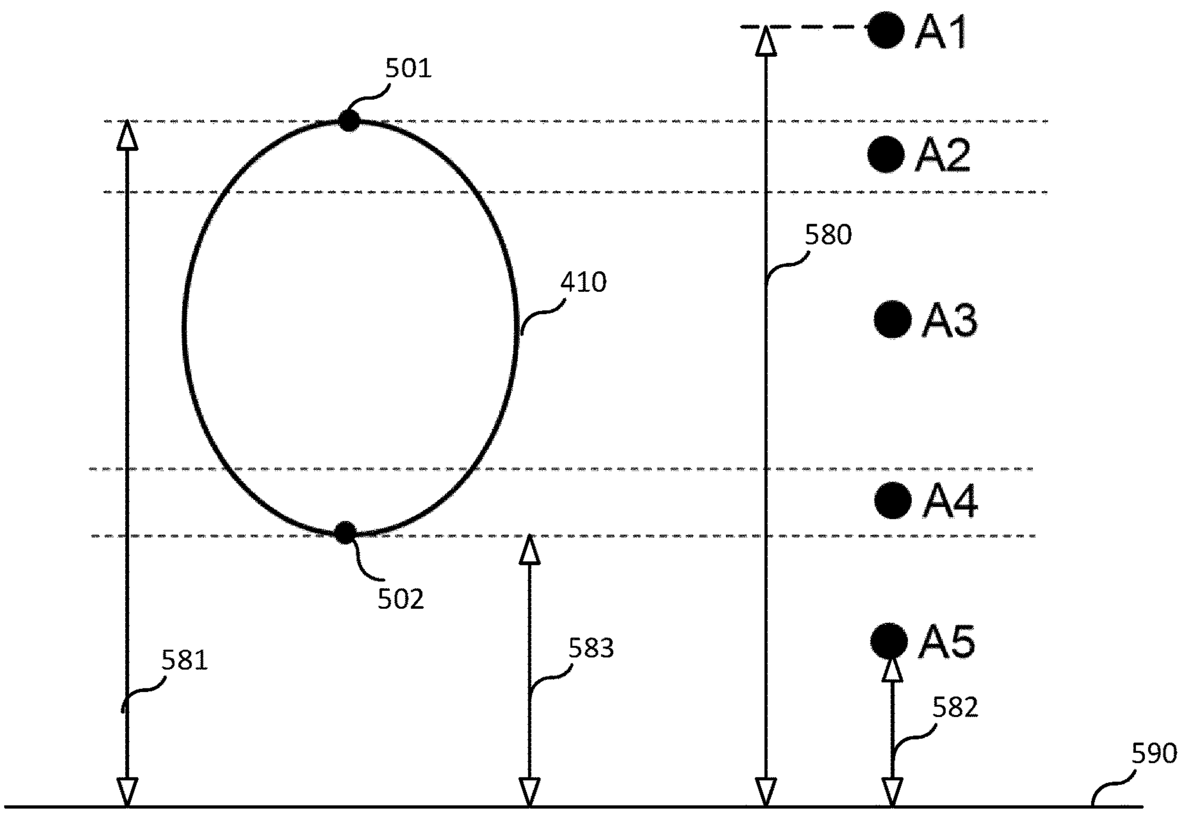
FIG. 5 illustrates various listening points.

This is illustrated in FIG. 5. That is, the topmost point 501 and bottom most point 502 of an audio element's extent 410 are used to define where the attenuation of the gain of the top and bottom hemispheres should start and end. Optionally there can be fade regions so that the attenuation can be gradually introduced. As shown in FIG. 5, listening point A1 is above the topmost point 501 of the extent 410 and therefore the top hemisphere should be attenuated (i.e., the vertical distance 580 between position A1 and a reference plane 590 is greater than the vertical distance 581 between topmost point 501 and the reference plane). Listening point A2 is inside the fade region where the attenuation of the top hemisphere is gradually reduced. Listening point A3 is in-between the top and bottom of the extent and here no attenuation is applied to the top or bottom hemispheres. Listening point A4 is inside the fade region where the attenuation of the bottom hemisphere is introduced gradually. Listening point A5 is below the bottommost point 502 of the extent and here the bottom hemisphere should be attenuated (i.e., the vertical distance 582 between position A5 and a reference plane 590 is less than the vertical distance 583 between bottommost point 502 and the reference plane 590). Using the topmost and bottommost points of the extent 410 as the basis for the adaptation might however not work ideally for very large extents with a more complex shape, where the height of the extent might vary in different parts of the extent.

In order to handle large, complex extents, a method can be used that considers only the part of the extent that is relevant for a certain listening point. This can mean that only parts of the extent that is within a certain distance from the listener is taken into account, or that only the part of the extent that is seen as the perceptually relevant part of the extent using some perceptual model. Thus, in this embodiment, the top hemisphere is attenuated if the listener position is higher than the topmost point of a relevant portion of the extent, and the bottom hemisphere is attenuated if the listener position is lower than the bottommost point of the relevant portion of the extent.

If there is an exterior representation available as in reference [10], this may represent the perceptually relevant part of the extent, in which case, only the points defining the exterior representation need to be evaluated. The exterior representation is, however, not valid when the listener is situated inside the extent, so with this method it might be beneficial to have the fade regions outside of the extent so that any attenuation is gradually reduced when getting closer to the extent and that there is no attenuation at all when the listener is inside the extent.

Modification of the interior representation in the spatial harmonics domain:

In some cases, the rendering of the interior representation is not done using virtual speakers, but is instead done with a direct rendering from the interior representation, e.g., an Ambisonics signals can be rendered directly to a binaural signal within the spherical harmonics domain. In this case the attenuation of the different hemispheres cannot be done by applying a gain factor to individual loudspeaker signals, instead the spatial modification needs to be applied in the spatial harmonics domain before the rendering is done. Several methods are known how to do this spatial modification, e.g., so called spatial cap can be used to perform directional loudness modifications to the Ambisonics signal as described in reference [11].

The same principles can be used in order to derive the wanted gain for the top, bottom and rear hemispheres as described previously but the application of the gain modification is then done using one spatial cap function for each hemisphere that should be attenuated.

Figure 6:
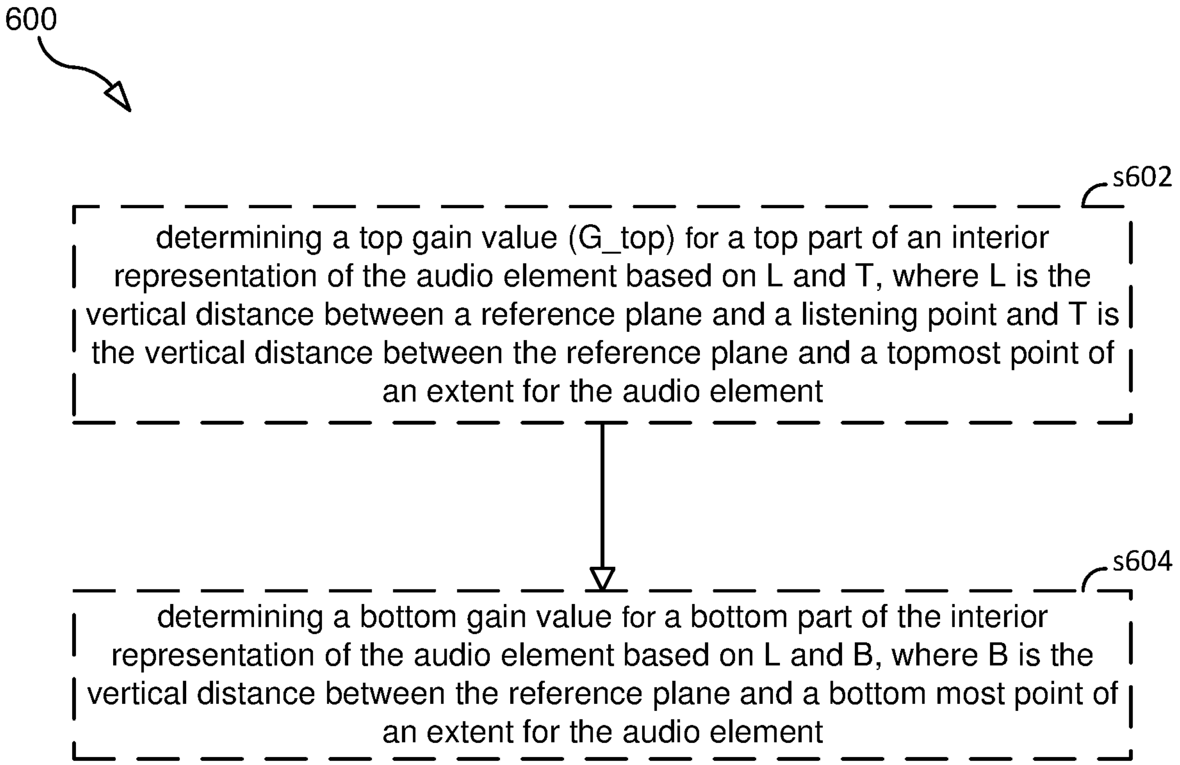
FIG. 6 is a flowchart illustrating a process according to some embodiments.

FIG. 6 is a flowchart illustrating a process 600, according to an embodiment, for rendering an audio element. Process 600 may begin in step s602 or step s604.

Step s602 comprises determining a top gain value (G_top) for a top part of an interior representation of the audio element based on L and T, where L is the vertical distance between a reference plane and the listening point and T is a vertical distance between the reference plane and a topmost point of an extent of the audio element (e.g., point 501). For instance, in one embodiment, when L is greater than T, G_top is inversely proportional to the difference between L and T (e.g., G_top≈α×1/(L−T), where a is a predetermined correction factor. This would mean that G_top is faded out in a region above the topmost point.

In another embodiment G_top is calculated as:

$$\text{G\_top} = \begin{cases} 0.0, & L \geq T \\ \dfrac{T-L}{\beta}, & T-\beta \leq L < T \\ 1.0, & L < T-\beta \end{cases}$$

where β describes the size of a fade region that is below the topmost point. In another embodiment the fade region is above the topmost point and then G_top can be calculated as:

$$\text{G\_top} = \begin{cases} 0.0, & L \geq T+\beta \\ 1+\dfrac{T-L}{\beta}, & T \leq L < T+\beta. \\ 1.0, & L < T \end{cases}$$

Step s604 comprises determining a bottom gain value (G_bottom) for a bottom part of the interior representation of the audio element based on L and B, where B is a vertical distance between the reference plane and a bottommost point (e.g., point 502) of an extent of the audio element. For instance, in one embodiment, when L is less than B, G_bottom is inversely proportional to the difference between B and L (e.g., G_bottom≈α×1/(B−L). This would mean that G_bottom is faded out in a region below the bottommost point.

In another embodiment G_bottom is calculated as:

$$\text{G\_bottom} = \begin{cases} 1.0, & L \geq B+\beta \\ \dfrac{L-B}{\beta}, & B \leq L < B+\beta \\ 0.0, & L < B \end{cases}$$

where β describes the size of a fade region that is above the bottommost point 502. In another embodiment the fade region is below the bottommost point and then G_bottom can be calculated as:

$$G_{bottom} = \begin{cases} 1.0, & L \geq B \\ 1.0+\dfrac{L-B}{\beta}, & B-\beta \leq L < B. \\ 0.0, & L < B-\beta \end{cases}$$

In some embodiments, T is the vertical distance between a topmost point 501 of a selected portion of the extent for the audio element and the reference plane, and B is the vertical distance between a bottommost point 502 of the selected portion of the extent for the audio element and the reference plane.

In some embodiments, the audio element has an original extent and said extent of the audio element is a simplified extent for the audio element that represents the original extent from a certain listening point.

In some embodiments, the audio element is represented using a set of virtual speakers (e.g., speakers S1-S18) comprising a set of one or more top virtual speakers positioned above the listening point 101 and/or a set of one or more bottom virtual speakers positioned below the listening point.

In some embodiments, the set of top virtual speakers comprises a first top virtual speaker, and the method further comprises: producing a first top virtual speaker signal, y1, for the first top virtual speaker; and producing a gain adjusted first top virtual speaker signal, y1', wherein y1'=g*y1, where g is function of at least the top gain value; and using y1' to render the audio element.

In some embodiments, the set of virtual speakers comprises a set of two or more rear virtual speakers, wherein the set of rear virtual speakers comprises the first top virtual speaker, and the method further comprises determining a rear gain value (G_rear) for the set of rear virtual speakers, and g is a function of at least the top gain value (G_top) and the rear gain value (G_rear) (i.e., g=f(G_top, G_rear)—e.g., g=G_top*G_rear).

In some embodiments, the set of bottom virtual speakers comprises a first bottom virtual speaker, and the method further comprises: producing a first bottom virtual speaker signal, y2, for the first bottom virtual speaker; and producing a gain adjusted first bottom virtual speaker signal, y2', wherein y2'=g*y2, where g is function of at least the bottom gain value; and using y2' to render the audio element.

In some embodiments, the set of virtual speakers comprises a set of two or more rear virtual speakers, wherein the set of rear virtual speakers comprises the first bottom virtual speaker, and the method further comprises determining a rear gain value (G_rear) for the set of rear virtual speakers, and g is a function of at least the bottom gain value (G_bottom) and the rear gain value (G_rear) (i.e., g=f (G_bottom, G_rear)—e.g., g=G_bottom*G_rear).

Example Use Case

Figure 7A:
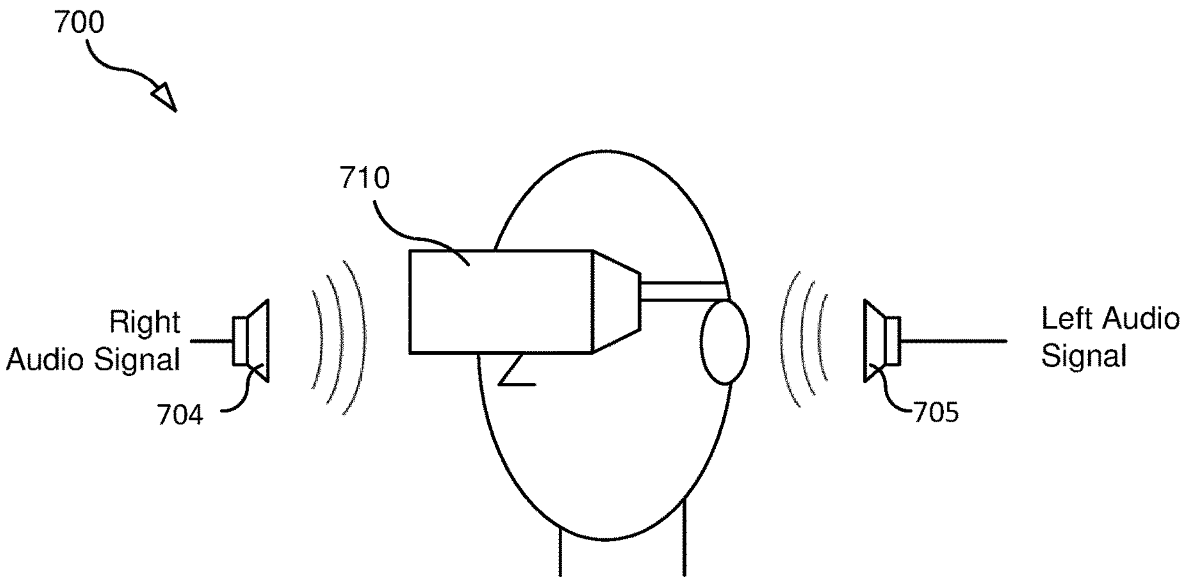
FIGS. 7A and 7B show a system according to some embodiments.

FIG. 7A illustrates an XR system 700 in which the embodiments disclosed herein may be applied. XR system 700 includes speakers 704 and 705 (which may be speakers of headphones worn by the listener) and an XR device 710, which may include a display for displaying images to the user and that, in some embodiments, is configured to be worn by the listener. In the illustrated XR system 700, XR device 710 has a display and is designed to be worn on the user's head and is commonly referred to as a head-mounted display (HMD).

Figure 7B:
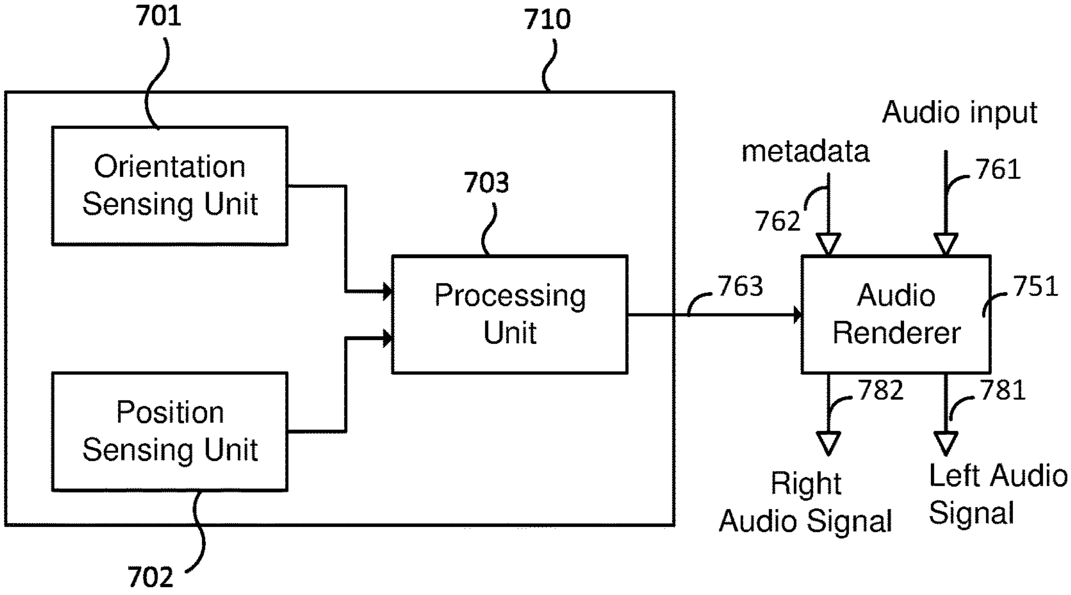

As shown in FIG. 7B, XR device 710 may comprise an orientation sensing unit 701, a position sensing unit 702, and a processing unit 703 coupled (directly or indirectly) to an audio render 751 for producing output audio signals (e.g., a left audio signal 781 for a left speaker and a right audio signal 782 for a right speaker as shown).

Orientation sensing unit 701 is configured to detect a change in the orientation of the listener and provides information regarding the detected change to processing unit 703. In some embodiments, processing unit 703 determines the absolute orientation (in relation to some coordinate system) given the detected change in orientation detected by orientation sensing unit 701. There could also be different systems for determination of orientation and position, e.g. a system using lighthouse trackers (LIDAR). In one embodiment, orientation sensing unit 701 may determine the absolute orientation (in relation to some coordinate system) given the detected change in orientation. In this case the processing unit 703 may simply multiplex the absolute orientation data from orientation sensing unit 701 and positional data from position sensing unit 702. In some embodiments, orientation sensing unit 701 may comprise one or more accelerometers and/or one or more gyroscopes.

Audio renderer 751 produces the audio output signals based on input audio signal 761, metadata 762 regarding the XR scene the listener is experiencing, and information 763 about the location and orientation of the listener. The metadata 762 for the XR scene may include metadata for each object and audio element included in the XR scene, and the metadata for an object or audio element may include information about the extent of the object or audio element. The metadata 762 may also include control information, such as a reverberation time value, a reverberation level value, and/or an absorption parameter. Audio renderer 751 may be a component of XR device 710 or it may be remote from the XR device 710 (e.g., audio renderer 751, or components thereof, may be implemented in the so called "cloud").

Figure 8:
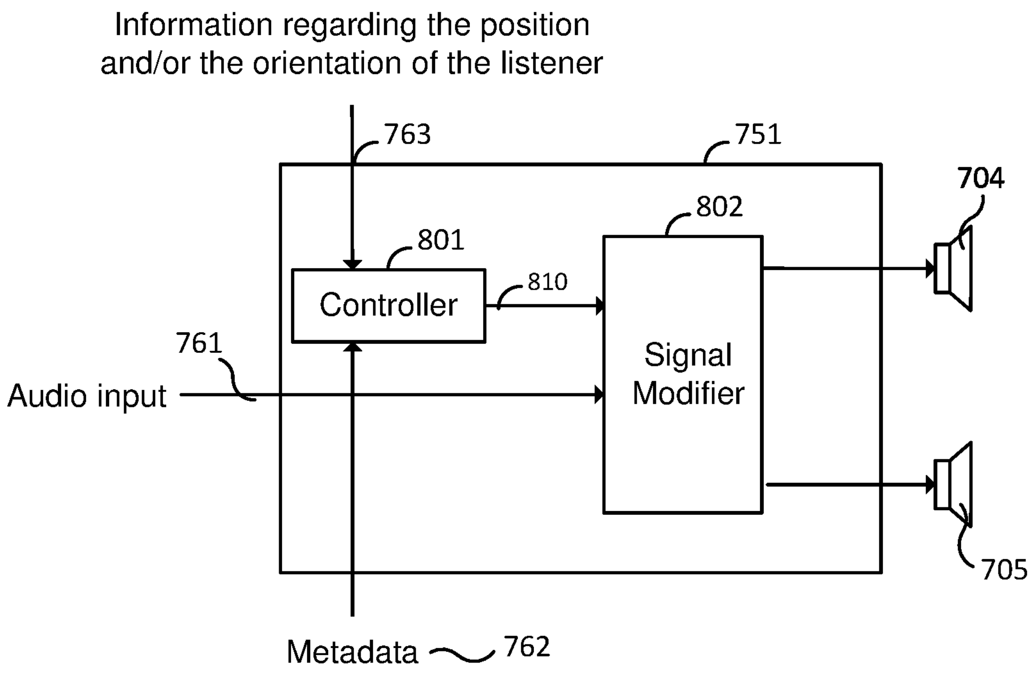
FIG. 8 illustrates a system according to some embodiments.

FIG. 8 shows an example implementation of audio renderer 751 for producing sound for the XR scene. Audio renderer 751 includes a controller 801 and a signal modifier 802 for modifying audio signal(s) 761 (e.g., the audio signals of a multi-channel audio element) based on control information 810 from controller 801. Controller 801 may be configured to receive one or more parameters and to trigger modifier 802 to perform modifications on audio signals 761 based on the received parameters (e.g., increasing or decreasing the volume level). The received parameters include information 763 regarding the position and/or orientation of the listener (e.g., direction and distance to an audio element) and metadata 762 regarding an audio element in the XR scene (in some embodiments, controller 801 itself produces the metadata 762). Using the metadata and position/orientation information, controller 801 may calculate one more gain factors (a.k.a., attenuation factors) for an audio element in the XR scene as described herein.

Figure 9:
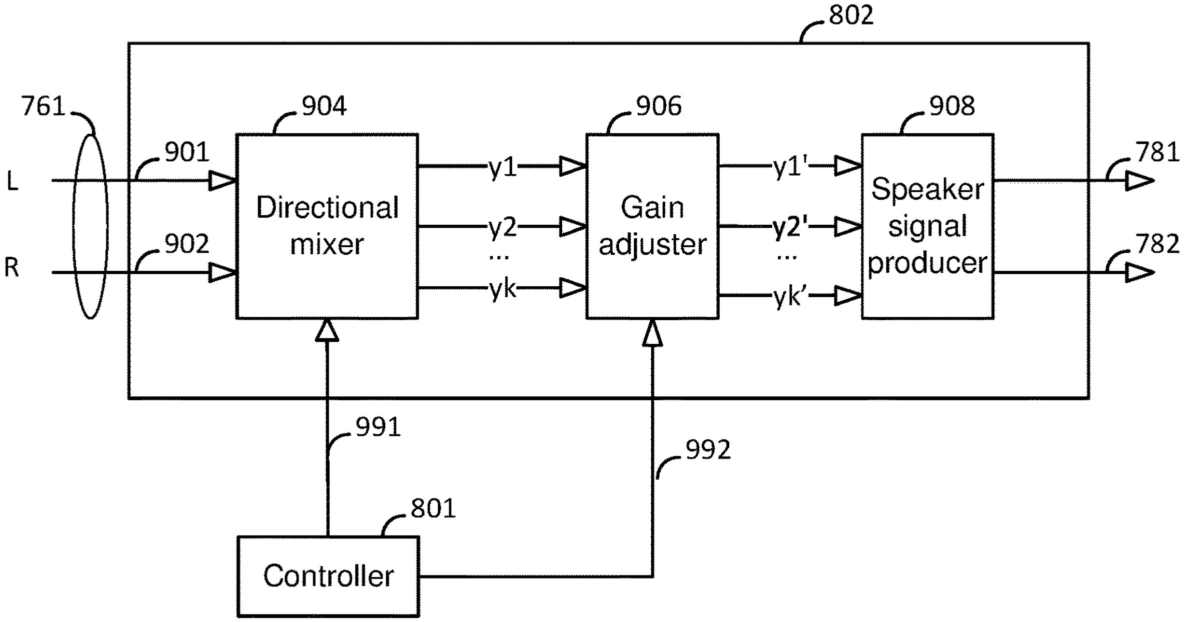
FIG. 9 illustrates a signal modifier according to an embodiment.

FIG. 9 shows an example implementation of signal modifier 802 according one embodiment. Signal modifier 802 includes a directional mixer 904, a gain adjuster 906, and a speaker signal producer 908.

Directional mixer 904 receives audio input 761, which in this example includes a pair of audio signals 901 and 902 associated with an audio element, and produces a set of k virtual speaker signals (y1, y2, . . . , yk) based on the audio input and control information 991. In one embodiment, the signal for each virtual speaker can be derived by, for example, the appropriate mixing of the signals that comprise the audio input 761. For example: $y1=f1\times L+f2\times R$, where L is input audio signal 901, R is input audio signal 902, and f1 and f2 are factors that are dependent on, for example, the position of the listener relative to the audio element and the position of the virtual loudspeaker to which y1 corresponds.

Gain adjuster 906 may adjust the gain of any one or more of the virtual speaker signals based on control information 992, which may include the above described gain factors as calculated by controller 901. That is, for example, controller 901 may produce a particular gain factor for the top, bottom, and rear hemispheres and provide these gain factors to gain adjuster 906 along with information indicating the signals to which the each gain factor should be applied.

Using virtual speaker signals y1', y2', . . . , yk', speaker signal producer 908 produces output signals (e.g., output signal 781 and output signal 782) for driving speakers (e.g., headphone speakers or other speakers). In one embodiment where the speakers are headphone speakers, speaker signal producer 908 may perform conventional binaural rendering to produce the output signals. In embodiments where the speakers are not headphone speakers, speaker signal produce may perform conventional speaking panning to produce the output signals.

Figure 10:
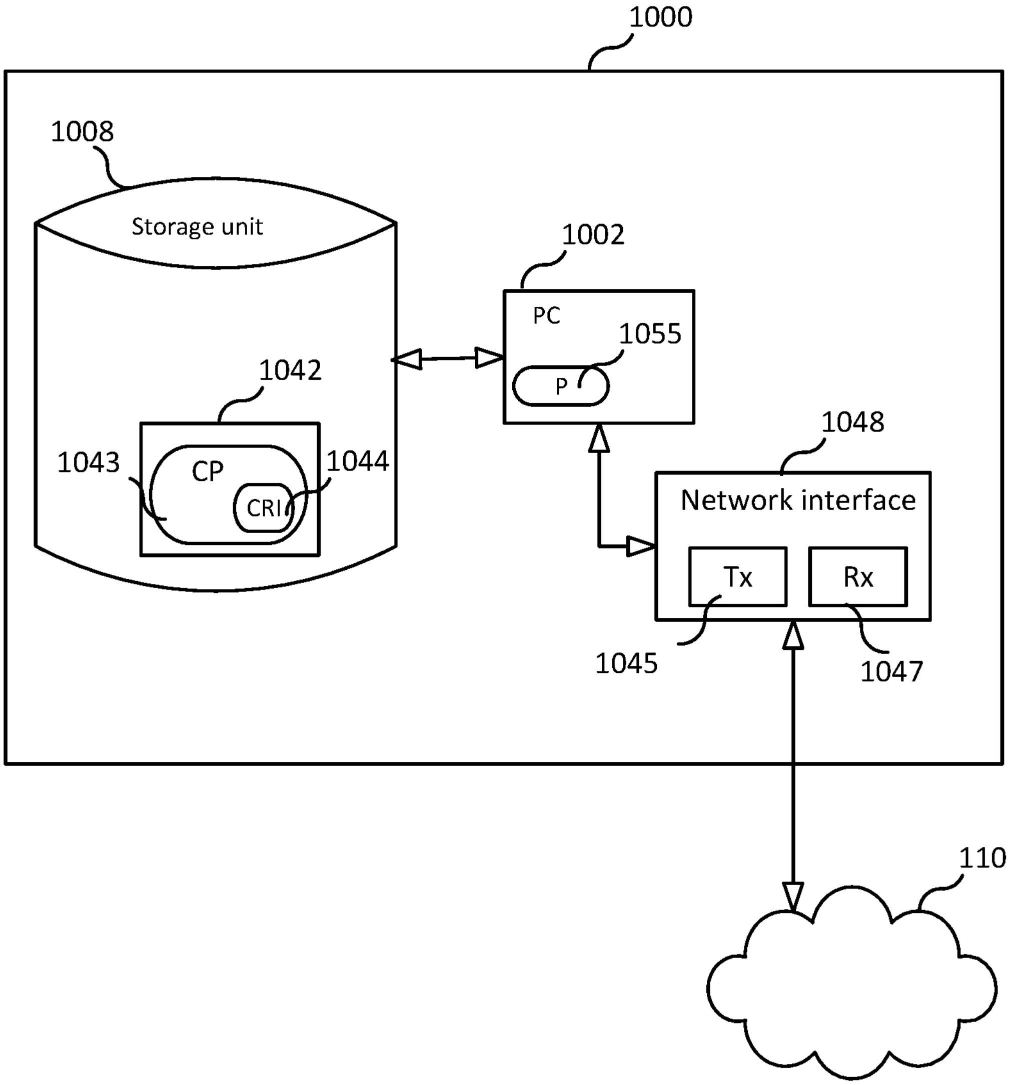
FIG. 10 is a block diagram of an apparatus according to some embodiments.

FIG. 10 is a block diagram of an audio rendering apparatus 1000, according to some embodiments, for performing the methods disclosed herein (e.g., audio renderer 751 may be implemented using audio rendering apparatus 1000). As shown in FIG. 10, audio rendering apparatus 1000 may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1000 may be a distributed computing apparatus); at least one network interface 1048 comprising a transmitter (Tx) 1045 and a receiver (Rx) 1047 for enabling apparatus 1000 to transmit data to and receive data from other nodes connected to a network 110 (e.g., an Internet Protocol (IP) network) to which network interface 1048 is connected (directly or indirectly) (e.g., network interface 1048 may be wirelessly connected to the network 110, in which case network interface 1048 is connected to an antenna arrangement); and a storage unit (a.k.a., "data storage system") 1008, which may include one or more non-volatile storage devices and/or one or more volatile storage devices. In embodiments where PC 1002 includes a programmable processor, a computer readable storage medium (CRSM) 1042 may be provided. CRSM 1042 stores a computer program (CP) 1043 comprising computer readable instructions (CRI) 1044. CRSM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes audio rendering apparatus 1000 to perform steps described herein (e.g., steps described herein with reference to the flow charts). In other embodiments, audio rendering apparatus 1000 may be configured to perform steps described herein without the need for code. That is, for example, PC 1002 may consist merely of one or more ASICs. Hence, the features of the embodiments described herein may be implemented in hardware and/or software.

Summary of Various Embodiments

A1. A method for rendering an audio element, the method comprising: determining a top gain value (G_top) for a top part of an interior representation of the audio element based on L and T, where L is the vertical distance between a reference plane and the listening point and T is a vertical distance between the reference plane and a topmost point of an extent of the audio element (e.g., point 501); and/or determining a bottom gain value (G_bottom) for a bottom part of the interior representation of the audio element based on L and B, where B is a vertical distance between the reference plane and a bottommost point (e.g., point 502) of an extent of the audio element.

A2. The method of embodiment A1, wherein T is the vertical distance between a topmost point of a selected portion of the extent for the audio element and the reference plane, and B is the vertical distance between a bottommost point of the selected portion of the extent for the audio element and the reference plane.

A3. The method of embodiment A1 or A2, wherein the audio element has an original extent and said extent of the audio element is a simplified extent for the audio element that represents the original extent from a certain listening point.

A4. The method of embodiment A1 or A2, wherein the audio element is represented using a set of virtual speakers comprising a set of one or more top virtual speakers positioned above a listening point and/or a set of one or more bottom virtual speakers positioned below the listening point.

A5. The method of embodiment A4, wherein the set of top virtual speakers comprises a first top virtual speaker, and the method further comprises: producing a first top virtual speaker signal, y1, for the first top virtual speaker; and producing a gain adjusted first top virtual speaker signal, y1', wherein y1'=g*y1, where g is function of at least the top gain value; and using y1' to render the audio element.

A6. The method of embodiment A5, wherein the set of virtual speakers comprises a set of two or more rear virtual speakers, wherein the set of rear virtual speakers comprises the first top virtual speaker, and the method further comprises determining a rear gain value (G_rear) for the set of rear virtual speakers, and g is a function of at least the top gain value (G_top) and the rear gain value (G_rear) (i.e., g=f(G_top, G_rear)—e.g., g=G_top*G_rear).

A7. The method of embodiment A4, wherein the set of bottom virtual speakers comprises a first bottom virtual speaker, and the method further comprises: producing a first bottom virtual speaker signal, y2, for the first bottom virtual speaker; and producing a gain adjusted first bottom virtual speaker signal, y2', wherein y2'=g*y2, where g is function of at least the bottom gain value; and using y2' to render the audio element.

A8. The method of embodiment A7, wherein the set of virtual speakers comprises a set of two or more rear virtual speakers, wherein the set of rear virtual speakers comprises the first bottom virtual speaker, and the method further comprises determining a rear gain value (G_rear) for the set of rear virtual speakers, and g is a function of at least the bottom gain value (G_bottom) and the rear gain value (G_rear) (i.e., g=f(G_bottom, G_rear)—e.g., g=G_bottom*G_rear).

B1. A computer program comprising instructions which when executed by processing circuitry of an audio renderer causes the audio renderer to perform the method of any one of the above embodiments.

B2. A carrier containing the computer program wherein the carrier is one of an electronic signal, an optical signal, a radio signal, and a computer readable storage medium.

D1. An audio rendering apparatus that is configured to perform the method of any one of the above embodiments.

D2. The audio rendering apparatus of embodiment D1, wherein the audio rendering apparatus comprises memory and processing circuitry coupled to the memory.

While various embodiments are described herein, it should be understood that they have been presented by way of example only, and not limitation. Thus, the breadth and scope of this disclosure should not be limited by any of the above described exemplary embodiments. Moreover, any combination of the above-described objects in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] MPEG-H 3D Audio, Clause 8.4.4.7: "Spreading" [2]
MPEG-H 3D Audio, Clause 18.1: "Element Metadata Pre-processing" [3]
MPEG-H 3D Audio, Clause 18.11: "Diffuseness Rendering" [4]
EBU ADM Renderer Tech 3388, Clause 7.3.6: "Divergence" [5]
EBU ADM Renderer Tech 3388, Clause 7.4: "Decorrelation Filters" [6]
EBU ADM Renderer Tech 3388, Clause 7.3.7: "Extent Panner"
[7] Efficient HRTF-based Spatial Audio for Area and Volumetric Sources", IEEE Transactions on Visualization and Computer Graphics 22 (4): 1-1•January 2016
[8] Patent Publication WO2020144062, "Efficient spatially-heterogeneous audio elements for Virtual Reality."
[9] Patent Publication WO2021180820, "Rendering of Audio Objects with a Complex Shape."
[10] International Patent Application No. PCT/EP2021/068833, "Seamless Rendering of Audio Elements with Both Interior and Exterior Representations," filed on Jul. 7, 2021.
[10] M. Kronlachner, F. Zotter, "Spatial transformations for the enhancement of Ambisonic recordings", ICSA2014

The invention claimed is:

1. A method for rendering an audio element, the method comprising:

determining a top gain value, G_top, for a top part of an interior representation of the audio element based on L and T, where L is the vertical distance between a reference plane and a listening point and T is a vertical distance between the reference plane and a topmost point of an extent of the audio element; and/or determining a bottom gain value, G_bottom, for a bottom part of the interior representation of the audio element based on L and B, where B is a vertical distance between the reference plane and a bottommost point of the extent of the audio element, wherein the audio element is represented using at least a first virtual speaker, and the method further comprises:

producing a first virtual speaker signal, y1, for the first virtual speaker;

using g and y1 to produce a gain adjusted first virtual speaker signal, y1', where g is function of at least the top gain value or the bottom gain value; and using y1' to render the audio element.

2. The method of claim 1, wherein

T is the vertical distance between a topmost point of a selected portion of the extent for the audio element and the reference plane, and B is the vertical distance between a bottommost point of the selected portion of the extent for the audio element and the reference plane.

3. The method of claim 1, wherein the audio element has an original extent and said extent of the audio element is a simplified extent for the audio element that represents the original extent from a certain listening position.

4. The method of claim 1, wherein the audio element is represented using a set of virtual speakers comprising a set of one or more top virtual speakers positioned above a listening point and/or a set of one or more bottom virtual speakers positioned below the listening point.

5. The method of claim 4, wherein the set of top virtual speakers comprises the first virtual speaker.

6. The method of claim 5, wherein the set of virtual speakers comprises a set of two or more rear virtual speakers, the set of rear virtual speakers comprises the first virtual speaker, the method further comprises determining a rear gain value, G_rear, for the set of rear virtual speakers, and g is a function of at least the top gain value, G_top, and the rear gain value, G_rear.

7. The method of claim 6, wherein $$g=G\_top*G\_\mathrm{rear}.$$

8. The method of claim 4, wherein the set of bottom virtual speakers comprises the first virtual speaker.

9. The method of claim 8, wherein the set of virtual speakers comprises a set of two or more rear virtual speakers, the set of rear virtual speakers comprises the first virtual speaker, the method further comprises determining a rear gain value, G_rear, for the set of rear virtual speakers, and g is a function of at least the bottom gain value, G_bottom, and the rear gain value, G_rear.

10. The method of claim 9, wherein $$g=G\_\mathrm{bottom}*G\_\mathrm{rear}.$$

11. The method of claim 1, wherein the method comprises determining G_top, and determining G_top comprises:

setting G_top to 0 if $L \geq T$, setting G_top to $(T-L)/\beta$ if ($T-\beta$ is $\leq L$ and $L<T$), where $\beta$ describes a size of a fade region below the topmost point, or setting G_top to 1 if $L< (T-\beta)$.

12. The method of claim 1, wherein the method comprises determining G_top, and determining G_top comprises:

setting G_top to 0 if $L \geq (T+\beta)$, setting G_top to $1+((T-L)/\beta)$ if (T is $\leq L$ and $L<T+\beta$), where $\beta$ describes a size of a fade region above the topmost point, or setting G_top to 1 if $L<T$.

13. The method of claim 1, wherein
the method comprises determining G_bottom, and determining G_bottom comprises:
setting G_bottom to 1 if L≥B+β,
setting G_bottom to (L−B)/β if (B is ≤L and L<B+β), where β describes a size of a fade region above the bottommost point, or
setting G_bottom to 0 if L<B.

14. The method of claim 1, wherein
the method comprises determining G_bottom, and determining G_bottom comprises:
setting G_bottom to 1 if L≥B,
setting G_bottom to 1+((L−B)/β) if (B−β is ≤L and L<B), where β describes a size of a fade region below the bottommost point, otherwise
setting G_bottom to 0 if L< (B−β).

15. An audio rendering apparatus, the audio rendering comprising:
processing circuitry; and
memory storing instructions which when executed by the processing circuitry of causes the audio rendering apparatus to perform a method comprising:
determining a top gain value, G_top, for a top part of an interior representation of an audio element based on L and T, where L is the vertical distance between a reference plane and a listening point and T is a vertical distance between the reference plane and a topmost point of an extent of the audio element; and/or
determining a bottom gain value, G_bottom, for a bottom part of the interior representation of the audio element based on L and B, where B is a vertical distance between the reference plane and a bottommost point of the extent of the audio element, wherein
the audio element is represented using at least a first virtual speaker, and
the method further comprises:
producing a first virtual speaker signal, y1, for the first virtual speaker;
using g and y1 to produce a gain adjusted first virtual speaker signal, y1', where g is function of at least the top gain value or the bottom gain value; and
using y1' to render the audio element.

16. The audio rendering apparatus of claim 15, wherein
T is the vertical distance between a topmost point of a selected portion of the extent for the audio element and the reference plane, and
B is the vertical distance between a bottommost point of the selected portion of the extent for the audio element and the reference plane.

17. The audio rendering apparatus of claim 15, wherein the audio element has an original extent and said extent of the audio element is a simplified extent for the audio element that represents the original extent from a certain listening position.

18. The audio rendering apparatus of claim 15, wherein the audio element is represented using a set of virtual speakers comprising a set of one or more top virtual speakers positioned above a listening point and/or a set of one or more bottom virtual speakers positioned below the listening point.

19. The audio rendering apparatus of claim 18, wherein
the set of top virtual speakers comprises the first virtual speaker.

20. The audio rendering apparatus of claim 19, wherein
the set of virtual speakers comprises a set of two or more rear virtual speakers,
the set of rear virtual speakers comprises the first virtual speaker,
the audio rendering apparatus is further configured to determine a rear gain value, G_rear, for the set of rear virtual speakers, and
g is a function of at least the top gain value, G_top, and the rear gain value, G_rear.

21. The audio rendering apparatus of claim 18, wherein
the set of bottom virtual speakers comprises the first virtual speaker.

22. The audio rendering apparatus of claim 21, wherein
the set of virtual speakers comprises a set of two or more rear virtual speakers,
the set of rear virtual speakers comprises the first virtual speaker,
the audio rendering apparatus is further configured to determine a rear gain value, G_rear, for the set of rear virtual speakers, and
g is a function of at least the bottom gain value, G_bottom, and the rear gain value, G_rear.

23. The audio rendering apparatus of claim 15, wherein
the audio rendering apparatus is configured to determine G_top by performing a process that includes one of the following steps:
setting G_top to 0 if L≥T,
setting G_top to (T−L)/β if (T−β is ≤L and L<T), where β describes a size of a fade region below the topmost point, or
setting G_top to 1 if L< (T−β).

24. The audio rendering apparatus of claim 15, wherein
the audio rendering apparatus is configured to determine G_top by performing a process that includes one of the following steps:
setting G_top to 0 if L≥(T+β),
setting G_top to 1+((T−L)/β) if (T is ≤L and L<T+β), where β describes a size of a fade region above the topmost point, or
setting G_top to 1 if L<T.

25. The audio rendering apparatus of claim 15, wherein
the audio rendering apparatus is configured to determine G_bottom by performing a process that includes one of the following steps:
setting G_bottom to 1 if L≥B+β,
setting G_bottom to (L−B)/β if (B is ≤L and L<B+B), where β describes a size of a fade region above the bottommost point, or
setting G_bottom to 0 if L<B.

26. The audio rendering apparatus of claim 15, wherein
the audio rendering apparatus is configured to determine G_bottom by performing a process that includes one of the following steps:
setting G_bottom to 1 if L≥B,
setting G_bottom to 1+((L−B)/β) if (B−β is ≤L and L<B), where β describes a size of a fade region below the bottommost point, otherwise
setting G_bottom to 0 if L< (B−β).

* * * * *